(12) United States Patent
Kuroda et al.

(10) Patent No.: US 12,223,102 B2
(45) Date of Patent: Feb. 11, 2025

(54) REMOTE WORK SUPPORT SYSTEM

(71) Applicants: DAIKIN INDUSTRIES, LTD., Osaka (JP); FAIRY DEVICES INC., Tokyo (JP)

(72) Inventors: Yuuko Kuroda, Osaka (JP); Ashish Busi, Osaka (JP); Yoshinao Inaba, Osaka (JP); Taro Kataoka, Osaka (JP); Masato Fujino, Tokyo (JP); Yuichiro Takezaki, Tokyo (JP)

(73) Assignees: DAIKIN INDUSTRIES, LTD., Osaka (JP); FAIRY DEVICES INC., Tokyo (JP)

( * ) Notice: Subject to any disclaimer, the term of this patent is extended or adjusted under 35 U.S.C. 154(b) by 0 days.

(21) Appl. No.: 17/748,805

(22) Filed: May 19, 2022

(65) Prior Publication Data

US 2022/0276701 A1 Sep. 1, 2022

Related U.S. Application Data

(63) Continuation of application No. PCT/JP2020/037310, filed on Sep. 30, 2020.

(30) Foreign Application Priority Data

Nov. 20, 2019 (JP) .................. 2019-209987

(51) Int. Cl.
*G06F 3/01* (2006.01)
*G06F 1/16* (2006.01)
*G06F 3/16* (2006.01)

(52) U.S. Cl.
CPC .............. *G06F 3/011* (2013.01); *G06F 1/163* (2013.01); *G06F 3/167* (2013.01)

(58) Field of Classification Search
CPC ........ G06F 3/0486; G06F 3/023; G06F 3/011; G06F 1/163; G06F 3/167; G06F 17/27;
(Continued)

(56) References Cited

U.S. PATENT DOCUMENTS

2008/0088646 A1 4/2008 Sako et al.
2015/0348328 A1 12/2015 Tsuda et al.
(Continued)

FOREIGN PATENT DOCUMENTS

CN 108156033 A 6/2018
CN 110166752 A 8/2019
(Continued)

OTHER PUBLICATIONS

International Preliminary Report of corresponding PCT Application No. PCT/JP2020/037310 dated Jun. 2, 2022.
(Continued)

*Primary Examiner* — Michael A Faragalla
(74) *Attorney, Agent, or Firm* — Global IP Counselors, LLP

(57) ABSTRACT

A remote work support system includes a wearable device worn by a site worker, a mobile terminal carried by the site worker separately from the wearable device, and a support operator terminal used by a support operator who remotely supports the site worker. The wearable device includes an image capturing unit, a voice input unit, and a voice output unit. The wearable device transmits an image. The wearable device transmits and receives voice. The mobile terminal includes a display unit to display a received image. The support operator terminal includes a voice input unit, a voice output unit, and a display unit. The support operator terminal transmits and receive voice to and from the wearable device. The support operator terminal receives an image from the (Continued)

wearable device. The support operator terminal transmits an image to the mobile terminal.

18 Claims, 4 Drawing Sheets

(58) Field of Classification Search
CPC .... G06F 3/14; G06F 3/01; G06F 1/16; H04N 5/232; H04N 5/265; G02B 27/01; G06T 19/00
See application file for complete search history.

(56) References Cited

U.S. PATENT DOCUMENTS

| | | | |
|---|---|---|---|
| 2016/0031570 | A1 | 2/2016 | Ordy et al. |
| 2016/0269631 | A1 | 9/2016 | Jiang et al. |
| 2016/0357491 | A1* | 12/2016 | Oya ................. G06T 19/006 |
| 2017/0280239 | A1* | 9/2017 | Sekiya .................. H04R 3/00 |
| 2018/0164963 | A1* | 6/2018 | Ku .................. G06F 3/04842 |
| 2019/0191805 | A1 | 6/2019 | Jiang et al. |
| 2019/0205010 | A1* | 7/2019 | Fujii ................. G06F 3/03547 |
| 2019/0316912 | A1* | 10/2019 | Maggiore ............ H04W 4/029 |
| 2020/0221245 | A1 | 7/2020 | Mochizuki et al. |

FOREIGN PATENT DOCUMENTS

| | | |
|---|---|---|
| EP | 1 914 998 A2 | 4/2008 |
| JP | 11-110034 A | 4/1999 |
| JP | 11-345021 A | 12/1999 |
| JP | 2003-37681 A | 2/2003 |
| JP | 2004-356743 A | 12/2004 |
| JP | 2008-96868 A | 4/2008 |
| JP | 2008-123366 A | 5/2008 |
| JP | 2011-34180 A | 2/2011 |
| JP | 2011-39996 A | 2/2011 |
| JP | 2015-228009 A | 12/2015 |
| JP | 2016-181767 A | 10/2016 |
| JP | 2018-67773 A | 4/2018 |
| JP | 2018-92478 A | 6/2018 |
| JP | 2018-185570 A | 11/2018 |
| JP | 2018-207420 A | 12/2018 |
| KR | 101662689 B1 | 10/2016 |
| WO | 2016/063587 A1 | 4/2016 |
| WO | 2017/169909 A1 | 10/2017 |
| WO | 2019/026597 A1 | 2/2019 |

OTHER PUBLICATIONS

European Search Report of corresponding EP Application No. 20 89 1306.1 dated Dec. 14, 2023.
International Search Report of corresponding PCT Application No. PCT/JP2020/037310 dated Dec. 8, 2020.

* cited by examiner

REMOTE WORK SUPPORT SYSTEM

CROSS-REFERENCE TO RELATED APPLICATIONS

This is a continuation of International Application No. PCT/JP2020/037310 filed on Sep. 30, 2020, which claims priority to Japanese Patent Application No. 2019-209987, filed on Nov. 20, 2019. The entire disclosures of these applications are incorporated by reference herein.

BACKGROUND

Technical Field

The present disclosure relates to a remote work support system for allowing a support operator located in a remote location to support a worker at a work site.

Background Art

A remote work support system is known in which a worker is equipped with a camera terminal and a support operator in a remote location operates the camera terminal to support the worker Japanese Unexamined Patent Publication No. 2018-207420 discloses a work support system that enables a worker to check an object to work via voice communication without using a display device.

SUMMARY

Various types of wearable devices have also been devised. An eyeglass-type device is capable of displaying information in or near portions corresponding to lenses of eyeglasses. In a case where an eyeglass-type device is used to support a worker, display of an image or the like transmitted from a support operator on eyeglass lenses reduces the field of vision of the worker, which may reduce work efficiency and cause danger. However, conversely, a worker terminal (wearable device) without a display faces a dilemma in that the worker is not allowed to check the image transmitted from the support operator.

A remote work support system according to a first aspect includes a wearable device configured to be worn by a site worker, a mobile terminal configured to be carried by the site worker separately from the wearable device, and a support operator terminal configured to be used by a support operator who remotely supports the site worker. The wearable device includes an image capturing unit, a voice input unit, and a voice output unit. The wearable device is configured to transmit an image. The wearable device is configured to transmit and receive voice. The mobile terminal includes a display unit configured to display a received image. The support operator terminal includes a voice input unit, a voice output unit, and a display unit. The support operator terminal is configured to transmits and receive voice to and from the wearable device. The support operator terminal is configured to receive an image from the wearable device. The support operator terminal is configured to transmit an image to the mobile terminal.

DETAILED DESCRIPTION OF EMBODIMENT(S)

First Embodiment (1) Overall Configuration

Figure 2:
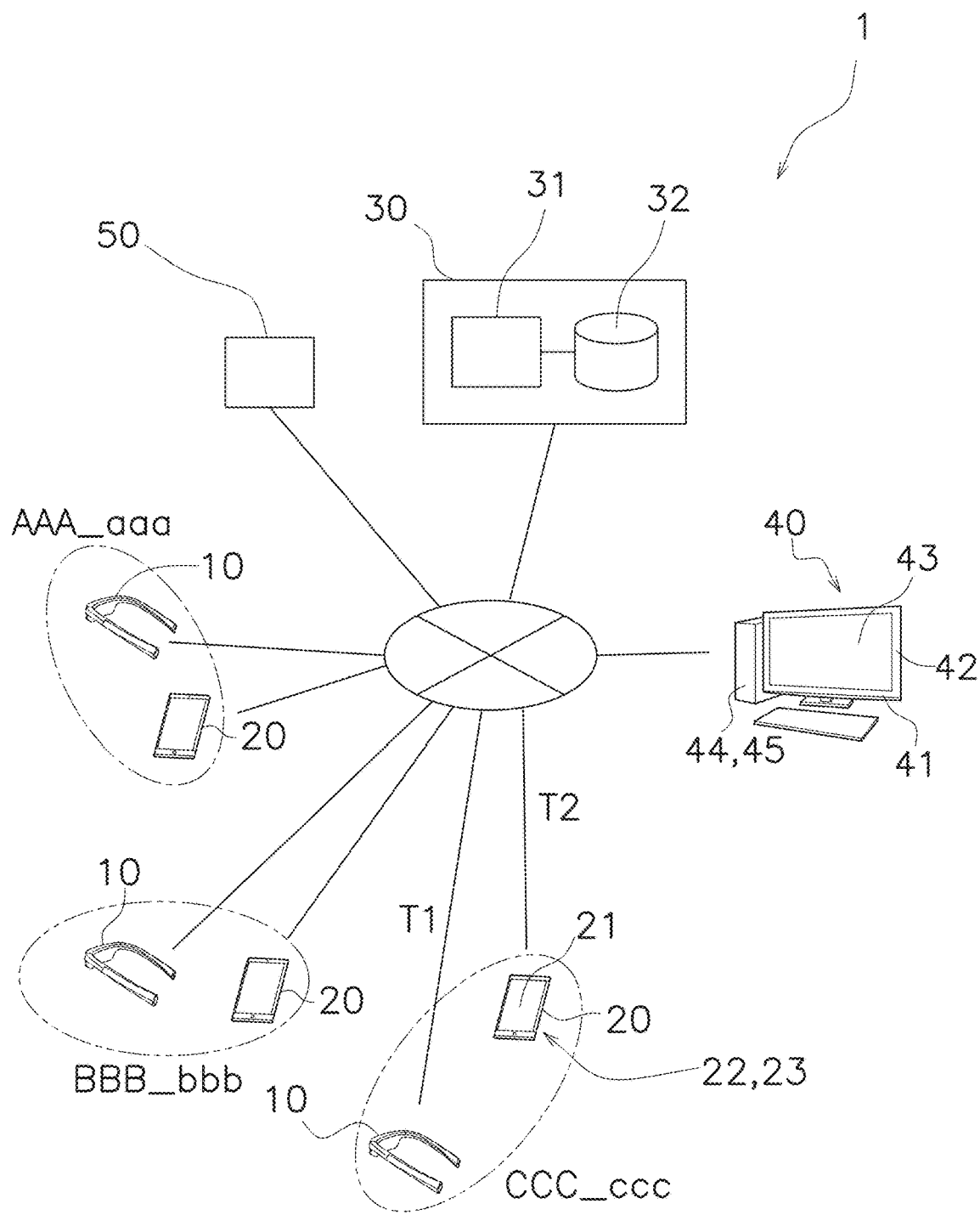
FIG. 2 is an overall schematic diagram of a remote work support system 1 according to the first embodiment.

As illustrated in FIG. 2, a remote work support system 1 according to a first embodiment includes a wearable device 10, a mobile terminal 20, a server 30, a support operator terminal 40, and a database 50. The wearable device 10 and the mobile terminal 20 are held by each of site workers "AAA_aaa", "BBB_bbb", and "CCC_ccc". The site workers are a plurality of workers dispatched to a plurality of separate sites. In FIG. 2, three workers are dispatched to three sites. However, the number of sites and the number of workers are not limited to those. The support operator terminal 40 is arranged so as to be used by a support operator located remotely from the site workers.

The wearable device 10, the mobile terminal 20, the server 30, the support operator terminal 40, and the database 50 arm connected to a common network and are capable of communicating with each other.

In this specification, site workers are sometimes referred to as workers, and both are the same in meaning.

In this specification, the term "work" refers to any of repair and maintenance of a device, site investigation for installation of a device, and installation and mounting of a device.

(2) Detailed Configuration (2-1) Wearable Device 10

Figure 1:
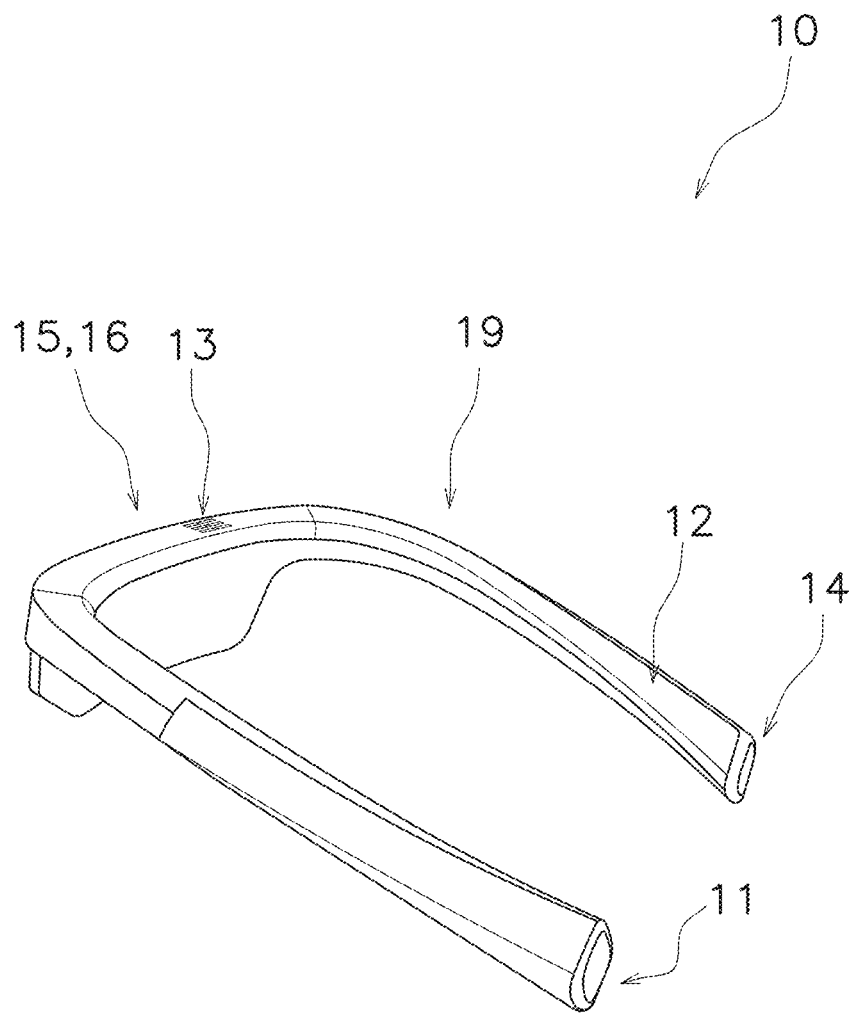
FIG. 1 is a perspective view of a wearable device 10 according to a first embodiment.

As illustrated in FIG. 1, the wearable device 10 is a neck-mounted device. The wearable device 10 is shaped into a loop, a portion of which is open. The wearable device 10 is worn on the neck of a worker using the open portion such that the open portion is located at the front of the body of the worker.

The wearable device 10 is a neck-mounted device, which allows the worker to work with both hands free even while wearing the wearable device 10. In addition, unlike the eyeglass type, the field of vision is not affected.

The wearable device 10 includes a main body 19, an image capturing unit 11, a voice input unit 12, a voice output unit 13, a gesture sensor 14, a control unit 15, a communication unit 16, and a power switch (not illustrated).

The main body 19 has both ends at which the image capturing unit 11 and the gesture sensor 14 are arranged.

The image capturing unit 11 is a camera. The camera continuously captures images of an area in front of the worker while the worker works. The captured images are moving images. The images may be still images. The captured images are sent to the server 30 from the communication unit 16 via the network. The images sent to the server 30 are saved in a storage unit 32 of the server 30. The images sent to the server 30 are simultaneously displayed on a display unit 43 of the support operator terminal 40.

The gesture sensor 14 has a function of a switch. The wearer (worker) shows a sign in front of the gesture sensor, thereby being able to operate the wearable device. The operation may be, for example, to turn on or off capturing an image with the image capturing unit 11. The gesture sensor 14 may be used by the worker to call a support operator who uses the support operator terminal 40. The wearable device 10 may include a mechanical or electronic switch instead of the gesture sensor 14 or together with the gesture sensor 14.

The voice input unit 12 is a microphone. The microphone has directivity and preferentially collects voice generated by the wearer. The voice input unit 12 may be used by the worker, instead of the gesture sensor 14 or together with the gesture sensor 14, to call the support operator who use the support operator terminal 40. For example, the worker speaks the utterance "Help, please". Then, the utterance reaches the server 30 and is subjected to voice recognition and converted into text by the server 30. The server 30 identifies that the worker requests support from text-converted voice data, and blinks the name of the worker, "AAA aaa", in worker identification information 112 in the support operator terminal 40. Accordingly, the support operator is informed that the worker "AAA aaa" requests support.

The voice output unit 13 is a speaker. The voice output unit 13 is arranged in a portion of the wearable device 10 behind the body of the wearer (worker).

The wearable device 10 according to this embodiment includes the voice input unit 12, the voice output unit 13, and the communication unit 16 that transmits and receives voice. This enables the worker wearing the wearable device 10 to have a telephone conversation with the support operator by using the device as a telephone.

The communication unit 16 is connected to the network via a first line T1. Voice input through the voice input unit 12 and an image captured with the image capturing unit 11 can be transmitted to the network as electronic data. Further, the communication unit 16 receives voice as electronic data from the network.

The control unit 15 is a computer. The control unit 15 includes a processor and a storage unit. The control unit 15 controls the image capturing unit 11, the voice input unit 12, the voice output unit 13, the gesture sensor 14, and the communication unit 16. The control unit 15 receives a control command input to the gesture sensor 14 and executes the control command. The control unit 15 executes a command from the server 30 and a command input by the support operator operating the support operator terminal 40.

(2-2) Mobile Terminal 20

The mobile terminal 20 is carried or held by the worker. The mobile terminal 20 may be a smartphone, a tablet, a PC, or the like. The mobile terminal 20 includes a display unit 21, a communication unit 22, and a control unit 23. The mobile terminal 20 is connected to the network via a second line T2.

The communication unit 22 receives an image from the network. The image may be a moving image or a still image.

The display unit 21 is a display. The display unit 21 displays an image received from the network. An image processed by the support operator using the support operator terminal 40 is transmitted to the mobile terminal 20 via the network and is displayed on the display unit 21. The image may be a moving image or a still image.

The control unit 23 is a computer. The control unit 23 includes a processor and a storage unit. The control unit 23 controls the display unit 21 and the communication unit 22.

Unlike the wearable device 10, the mobile terminal 20 does not need to be always connected to the support operator terminal 40 (or the server 30) while the worker works. The mobile terminal 20 may connect to the support operator terminal 40 only when an image (including text information) is sent from the support operator terminal 40 to the mobile terminal 20.

(2-3) Server 30

The server 30 is a computer. The server 30 includes a processor 31 and a storage unit 32. The storage unit 32 saves applications and data. In this embodiment, an application for the remote work support system 1, which is stored in the storage unit 32, is read and executed by the processor 31. The application for the remote work support system 1 is a web application. The support operator terminal 40 and the mobile terminal 20 each activate a browser and access the application for the remote work support system 1 through the browser.

When the worker activates the wearable device 10, the wearable device 10 connects to the server 30 and transmits an image captured with the image capturing unit 11 of the wearable device 10 to the server 30. The captured image is accumulated in the storage unit 32 of the server 30. The captured image is simultaneously viewable on the display unit 43 of the support operator terminal 40 in response to activation of the browser of the support operator terminal 40.

Further, the application for the remote work support system 1 enables a two-way telephone conversation to be established between the worker and the support operator in response to a connection request from the wearable device 10 or a connection request from the support operator terminal 40 while the worker works.

The server 30 converts voice acquired from the wearable device 10 and voice acquired from the support operator terminal 40 into text information by voice recognition. The text information is stored in the storage unit 32 for each item of work. Further, the text information is transmitted to the support operator terminal 40 and displayed on the display unit 43 of the support operator terminal 40. The text information is also transmitted to the mobile terminal 20 and displayed on the display unit 21 of the mobile terminal 20, as necessary.

The server 30 collects voice data of all the wearable devices 10 that are in communication and saves the voice data in the storage unit 32 as text information. If the voice of the worker "BBB bbb", who is currently connected to the support operator terminal 40 but is not supported, includes wording that requests support, the server 30 blinks the name of the worker, "BBB bbb", in the worker identification information 112 in the support operator terminal 40.

The server 30 may also have an automatic translation function. The voice data subjected to voice recognition is translated into another language. For example, when the site worker speaks in English and the support operator in the remote location speaks in Japanese, the words spoken by the site worker in English may be communicated to the support operator by voice in Japanese. Alternatively, the words may be displayed in Japanese in an utterance record 116 on the display unit 43 of the support operator terminal 40. English text and Japanese text may be displayed together.

An image and text-converted voice information, which are generated during work support, and an image processed by the support operator are saved in the storage unit 32 of the server 30. These pieces of information may be stored in any other location. For example, these pieces of information may be saved in the database 50. These pieces of information may be saved in a storage unit of the support operator terminal 40.

(2-4) Database 50

The database 50 includes a storage unit that saves electronic data. The database 50 is connected to the network. In this embodiment, the database 50 stores site work support information used for repair or maintenance of devices. The storage of the site work support information is not limited to the database 50. The site work support information may be stored in the storage unit 32 of the server 30. The site work support information may be stored in the storage unit of the support operator terminal 40.

(2-5) Support Operator Terminal 40

The support operator terminal 40 is used by the support operator who remotely supports the site worker. The support operator terminal 40 may be a PC. The support operator terminal 40 includes a voice input unit 41, a voice output unit 42, a display unit 43, a communication unit 44, and a control unit 45.

The voice input unit 41 is a microphone. The voice output unit 42 is a speaker. The support operator terminal 40 according to this embodiment includes the voice input unit 41, the voice output unit 42, and the communication unit 44 that transmits and receives voice. This enables the support operator to have a telephone conversation with the site worker by using the support operator terminal 40 as a telephone.

The communication unit 44 is connected to the network. The communication unit 44 receives voice as electronic data from the network. The communication unit 44 further receives text information, which is obtained by the server 30 subjecting the voice to voice recognition and converting the voice into text. The communication unit 44 receives an image captured with the image capturing unit 11 of the wearable device 10. On the other hand, the communication unit 44 is capable of transmitting voice input through the voice input unit 41 and an image processed by the support operator using the support operator terminal 40 to the network as electronic data.

The display unit 43 is a display.

The control unit 45 is a computer. The control unit 45 includes a processor and a storage unit. The control unit 45 controls the voice input unit 41, the voice output unit 42, the display unit 43, and the communication unit 44. The storage unit of the control unit 45 stores a browser (program). The control unit 45 reads and executes a browser program. If the application for the remote work support system 1 has been executed by the server 30, the control unit 45 of the support operator terminal 40 is capable of using the browser to support work using the support operator terminal 40.

Communication among the wearable device 10, the mobile terminal 20, the server 30, the support operator terminal 40, and so on according to this embodiment may be performed by selectively using a plurality of communication protocols.

In this embodiment, for example, WebRTC is used as a communication protocol for moving images and voice. WebRTC is a standard protocol and has a feature of being secure but not flexible in design (capable of changing only parameters such as resolution). HTTPS, MQTT, or WebSocket may be used as a communication protocol for still images. These communication protocols have features of being designed flexibly and compatible with anything such as moving images, text, and still images and increasing the design level on the server side.

(2-5-1) Display Screen on Display Unit 43 of Support Operator Terminal 40

Figure 3:
FIG. 3 is a diagram illustrating an example of a display screen on a display unit 43 of a support operator terminal 40 according to the first embodiment.

FIG. 3 illustrates an example of a display screen on the browser of the display unit 43 of the support operator terminal 40 when the application for the remote work support system 1 is being executed.

The screen on the display unit 43 displays a work progress 111, worker identification information 112, a live image 113 of the site, a support-operator-processed image 114, a reference document list 115, and an utterance record 116.

The work progress 111 represents the number of work sites (or the number of workers) in which the support operator using the support operator terminal is engaged "today". The example indicates that two items of work have been completed "today".

The work progress 111 may display the state of progress of the work (which may be expressed as %) or the predicted end time of the work. To this end, through automatic extraction from the image captured with the image capturing unit 11 of the wearable device 10 and/or the utterances of the workers and the support operator, the server 30 may automatically estimate the state of progress of the work or the end time of the work.

The worker identification information 112 describes "currently online novice". This means a worker who is currently using the wearable device 10 connected to the support operator terminal 40. Here, an icon (photograph) of the worker and the name of the worker, "AAA aaa", are displayed. Then, the sign "LIVE" is displayed along with the icon of the worker "AAA aaa". The display of the sign "LIVE" indicates that the connection between the support operator terminal 40 and the wearable device 10 is active. The term "being active" refers to a state in which the live image 113 of the worker "AAA aaa" is being displayed on the screen and a voice connection has been established between the support operator and the worker "AAA aaa" so that a telephone conversation can be established therebetween.

While the worker identification information 112 in FIG. 3 shows five workers, some of the workers who are not active may be hidden and may be displayable by scrolling. Alternatively, the worker who is active may be displayed in large size, and some or all of the names of the other workers may be hidden.

The worker identification information 112 is not limited to the icon or the name of the worker, and may include the ID number of the worker, the address of the site, the model number or ID number of a device (here, an air conditioner) on which the worker is working, the ID of the work, and so on. The worker identification information 112 is information by which the support operator can identify the worker or the work.

In addition, the method for displaying a worker who is active is not limited to the display of the sign "LIVE". It is sufficient that the support operator using the support operator terminal 40 identify a worker who is active. The worker identification information under connection may be displayed in large size, in blinking mode, with color changes, or in pop-up window.

The live image 113 indicates live video regarding the worker who is active, which is being captured with the image capturing unit 11 of the wearable device 10 of the worker, namely, the worker "AAA aaa". FIG. 3 illustrates an image of an outdoor unit of the air conditioner. In the active state, a voice connection has been established with the worker "AAA aaa", and thus the support operator can provide instructions by voice to instruct the worker to consequently move the position of the image capturing unit 11 of the wearable device 10 to switch to a different image.

The support-operator-processed image 114 is obtained by extracting and processing an image from the live image 113. In the support-operator-processed image 114 in FIG. 3, a center portion of a diagram showing a fan is marked with a circle, as well as the "Open the fan from here" instruction given by handwriting. The instruction is given by the support operator inputting characters or symbols on the support operator terminal 40 using a touch pen. The supportoperator-processed image 114 is transmitted to the mobile terminal 20 of the worker and displayed on the display unit 21, thereby being able to efficiently support the worker.

The reference document list 115 is a list of reference documents (site work support information) that are referred to by the support operator to provide support. The site work support information may include site investigation check items, a construction work procedure manual, or maintenance information. The support operator can extract a document necessary for construction from within the site work support information saved in the database 50, further extract a necessary portion from within the document, mark the extracted portion, as necessary, and then transmit the portion to the mobile terminal 20 of the worker.

The utterance record 116 displays the text of an utterance of the worker "AAA aaa", who is active, and the text of an utterance of the support operator in a distinguishable manner.

(3) Description of Support for Site Worker Using Remote Work Support System 1

Next, a method for supporting a worker using the remote work support system 1 according to this embodiment will be described.

The worker arrives at the site and starts work for repair or maintenance of a device. The device is assumed here to be an air conditioner. At the start of the work, the site worker wears the wearable device 10 on their body and turns on the power switch.

First, the worker shows a sign in front of the gesture sensor 14 to activate the image capturing unit 11. The image capturing unit 11 starts capturing an image. Further, the wearable device 10 is connected to the application for the remote work support system 1 in the server 30. The captured image is sent from the communication unit 16 to the server 30 via the network and accumulated in the storage unit 32 of the server 30.

To start support, the support operator activates the browser on the support operator terminal 40 and connects the support operator terminal 40 to the application for the remote work support system 1 in the server 30.

The power-on of the wearable device 10 and the connection of the support operator terminal 40 to the application for the remote work support system 1 in the server 30 does not need to be performed simultaneously. Either of them may be performed first. In response to the image capturing unit 11 of the wearable device 10 being activated and the support operator terminal 40 being connected to the application for the remote work support system 1 in the server 30 through the browser, both are connected.

The support operator who uses the support operator terminal 40 appropriately selects a worker and starts support.

To request the support operator for support, the worker shows a gesture in front of the gesture sensor 14 to indicate that the worker desires to be supported. The request for support may be made by another method such as voice. The support request from the worker is made by blinking the name of the worker, "AAA aaa", in the worker identification information 112 on the screen of the display unit 43 of the support operator terminal 40. To approve the support request from the worker, the support operator clicks on the name "AAA aaa" to make the connection with the worker "AAA aaa" active. In other words, the worker "AAA aaa" in the worker identification information 112 is marked with the sign "Live", an image captured by the wearable device 10 is displayed live in the live image 113, and a telephone conversation can be established between the worker "AAA aaa" and the support operator.

The support operator checks the moving image transmitted from the wearable device 10 of the worker "AAA aaa" and examines the content of the work support while having a telephone conversation with the worker "AAA aaa".

To access the worker from the support operator side, the support operator clicks on the worker name "AAA aaa" in the worker identification information 112 to make the connection with the worker "AAA aaa" active to display an image captured by the wearable device 10 live in the live image 113, and a telephone conversation between worker "AAA aaa" and the support operator can be established.

As the simplest support method, the support operator provides advice to the worker while having a telephone conversation with the worker "AAA aaa". The content of the utterances of the worker and the support operator is subjected to voice recognition and converted into text by the server 30, and is stored in the storage unit 32 of the server 30. The content of the utterances is simultaneously displayed in the utterance record 116 on the display unit 43 of the support operator terminal 40. The support operator reviews the content of the support and provides advice while checking the content of the utterances in the utterance record 116. Alternatively, the content of the utterance of the support operator or the content of the telephone conversation may be converted into text, which is transmitted to the mobile terminal 20 of the worker "AAA aaa" and displayed on the display unit 21, to perform support.

In addition, the support operator appropriately selects (cuts) an image from the live image 113 as a still image (snapshot), and displays the still image in the support-operator-processed image 114. The support operator further processes the displayed image. Specifically, the support operator cuts out a necessary portion, marks the portion, or writes characters on the portion. The image on which characters are written by the support operator is transmitted to the mobile terminal 20 of the worker "AAA aaa". The worker "AAA aaa" checks the display unit 21 of the mobile terminal 20 to check the image transmitted by the support operator. In this way, the worker proceeds with the work while being supported by the support operator.

While a case has been described above where the support-operator-processed image created by the support operator is a still image, the support-operator-processed image may be a moving image.

Support information provided by the support operator may be not only an image captured at the wearable device 10 and processed as described above, but also an image or characters (snapshot) extracted from a reference document (site work support information) or processed. The site work support information may be displayed in the reference document list 115 on the screen or may be obtained by search from a window in the reference document list 115. What is obtained by searching the reference document list 115 is stored in the database 50. For example, when the support operator determines that the instruction manual needs to be checked for support, the support operator clicks the instruction manual in the reference document list 115. Then, a new window pops up, and a page of the instruction manual is displayed. The support operator selects a predetermined page of the instruction manual, cuts out a necessary portion, and displays the cut out image (snapshot) in the support-operator-processed image 114. Here, the support operator processes an image (snapshot) of the predetermined page of the instruction manual to by marking the image (snapshot), writing characters on the image (snapshot), or performing other operation. The processed image is transmitted to the mobile terminal 20 of the worker as a support-operator-processed image in a way similar to that for an image captured by the wearable device 10 and selected and processed. The worker can proceed with the work with reference to the support-operator-processed image.

In the foregoing, a description has been given of a case where the site work support information is stored in the database 50. The site work support information may be saved in the storage unit 32 of the server 30. Alternatively, the site work support information may be saved in the storage unit of the support operator terminal 40. The site work support information may be obtained from any other source. For example, the site work support information may be information on a web site.

As described above, the support operator proceeds with support work for the worker "AAA aaa". When a support request is made by the worker "BBB bbb" after the support for the worker "AAA aaa" is completed or while the support for the worker "AAA aaa" is being performed, the name of the worker, "BBB bbb", in the worker identification information 112 on the display screen on the browser of the support operator terminal 40 blinks. The support operator viewing the blinking name clicks on the name of the worker, "BBB bbb", if the support operator is ready to start supporting the worker "BBB bbb". Then, the connection with the worker "BBB bbb" is made active. In other words, the worker "BBB bbb" in the worker identification information 112 is marked with the sign "Live", an image captured by the wearable device 10 is displayed live in the live image 113, and a telephone conversation between the worker "BBB bbb" and the support operator can be established.

In the way described above, work support for a plurality of workers is performed. Through work performed using the remote work support system 1 according to this embodiment, images captured by the wearable devices 10, voice including telephone conversations between the workers and the support operator, support-operator-processed images created by the support operator, and so on are accumulated in the storage unit 32 of the server 30. These are stored for each item of work. The server 30 may automatically create a report on the basis of the stored information.

(4) Features (4-1)

A remote work support system 1 according to this embodiment includes a wearable device 10, a mobile terminal 20, and a support operator terminal 40. The wearable device 10 is used by being worn by a site worker. The wearable device 10 includes an image capturing unit 11 and is capable of transmitting a captured image of the surroundings of the worker to the support operator terminal 40. Further, the wearable device 10 and the support operator terminal 40 can be used as telephones to establish a telephone conversation therebetween.

The wearable device 10 includes no display unit. When a wearable device includes a display unit, for example, like an eyeglass-type device, the worker may have a limited field of view, which may present a danger to the worker. The absence of a display unit provides an advantage in that such a concern is less likely to occur.

Furthermore, since the worker is carrying the mobile terminal 20, information on support from the support operator can be displayed on the display unit 21 of the mobile terminal 20, as necessary.

(4-2)

The wearable device 10 according to this embodiment is a neck-mounted device. This enables the worker to work with both hands free.

(4-3)

The image captured with the image capturing unit 11 of the wearable device 10 is a moving image or a still image.

Capturing a moving image makes it possible to continuously display the live image 113 on the display unit 43 of the support operator terminal 40.

The support operator can more easily create a support-operator-processed image by using a still image.

(4-4)

The image captured with the image capturing unit 11 of the wearable device 10 is selected, processed, or additionally provided with information using the support operator terminal 40. The resulting image is transmitted to the mobile terminal 20 and displayed on the display unit 21 of the mobile terminal 20.

Use of both the wearable device 10 and the mobile terminal 20 eliminates the need for the worker to view the support information of the support operator more than necessary, and enables the worker to view the support information on the mobile terminal 20 when necessary.

(4-5)

The utterances of the worker and the support operator are subjected to voice recognition and are displayed in the utterance record 116 on the display unit 43 of the support operator terminal 40 as text information.

Since the utterance record is displayed on the support operator terminal 40 as text information, the support operator easily checks the content of the telephone conversation and can support the worker by using it. Further, recording of the content of the utterances as text information can also be utilized to create a report.

(4-6)

The text information described above may also be displayed on the display unit 21 of the mobile terminal 20. It is useful also for the worker to be able to check, on the display unit 21, the conversation with the support operator in text. Alternatively, the text of the content of an important utterance may be extracted by the support operator and displayed on the mobile terminal 20 of the worker.

(4-7)

The remote work support system 1 includes a first line T1 connecting the support operator terminal 40 and the wearable device 10, and a second line T2 connecting the support operator terminal 40 and the mobile terminal 20. The first line T1 is continuously used while the worker works, and the second line T2 is connected, as necessary, while the worker works.

This enables the worker to work without constantly viewing the screen.

(4-8)

The server 30 of the remote work support system 1 stores an image captured with the image capturing unit 11 of the wearable device 10 in the storage unit 32 of the server 30. Further, the utterances of the worker and the support operator are subjected to voice recognition and converted into text, which is stored in the storage unit 32 of the server 30. The server 30 may estimate the state of progress of the work and the end time of the work from the image, the text characters, and so on and display the state of progress and the end time on the display unit 43 of the support operator terminal 40. The state of progress of the work may be estimated and displayed in form such as xx % completion. In this way, the support operator can be informed of the progress of the work.

(4-9)

The support operator terminal 40 displays the reference document list 115 on the display unit 43. Reference documents are site work support information. The site work support information is saved in a database 50 on a network. The support operator can access the content of the site work support information from the reference document list 115. The support operator extracts and processes the content of the site work support information and transmits the site work support information to the mobile terminal 20.

The support operator processes the site work support information and transmits the processed site work support information to the worker in the way described above, which eliminates the need for the worker to view a large amount of enormous materials and increases the efficiency of the worker.

(4-10)

The work support performed using the remote work support system 1 according to this embodiment includes support performed by various means. In other words, the work support includes any one or a combination of support by voice, support with a processed image, support by characters input from a support operator terminal, and support by characters obtained by converting an utterance of the support operator into text.

The support by voice is the same as support by telephone.

The support with a processed image includes support using an image captured by the wearable device 10 and support using processed site work support information.

The support by characters input from the support operator terminal 40 is support implemented as follows: The support operator inputs characters through the support operator terminal 40, and the characters are transmitted to the mobile terminal 20 and displayed on the display unit 21.

The support by characters obtained by converting an utterance of the support operator into text is support in which an utterance of the support operator is converted into text and text-converted information is sent to the mobile terminal 20 of the worker. The worker may fail to hear the utterance of the support operator or forget the utterance of the support operator. Accordingly, an important utterance is converted into text, and the text is transmitted, which may lead to effective support.

(5) Modifications (5-1) Modification 1A

In the first embodiment, as illustrated in FIG. 3, only the live image 113 of the worker "AAA aaa", who is active, is displayed on the display unit 43. In Modification 1A, live images of all the connected workers "AAA aaa", "BBB bbb", "CCC ccc", "DDD ddd", and "EEE eee" are displayed in the live image 113. In other words, live video of a worker who is not active is also displayed simultaneously in the live image 113. Note that the video of the worker "AAA aaa", who is active, is displayed in large size in an upper portion, whereas the video of the workers "BBB bbb", "CCC ccc", "DDD ddd", and "EEE eee", who are not active, is displayed in small size in a lower portion. In this way, the display unit 43 according to Modification 1A allows the support operator to know the approximate behavior of a worker who is not active, or a worker who is not being supported. Using this, for example, the support operator can alert a worker who attempts to perform an undesirable behavior.

(5-2) Modification 1B

In the first embodiment, voice is subjected to voice recognition and converted into text by the server 30. In Modification 1B, voice recognition and conversion into text are performed by the wearable device 10 or the support operator terminal 40. Accordingly, the wearable device 10 or the support operator terminal 40 transmits both voice audio data and voice text data to the network. Further, the wearable device 10 or the support operator terminal 40 may have a translation function in addition to the voice recognition function.

(5-3) Modification 1C

In the first embodiment, the wearable device 10 is a neck-mounted device. The wearable device 10 may be of any other type. The wearable device 10 is preferably a device that is worn on the body while leaving both hands free. The wearable device 10 according to Modification 1C is worn on the head. Specifically, the wearable device 10 is of a helmet type, a hat type, or a hairband type.

(5-4) Modification 1D

In the remote work support system 1 according to the first embodiment, the site worker holds and uses the wearable device 10 and the mobile terminal 20. The remote work support system 1 may further use another device. The other device may be connected to the support operator terminal 40 via the network. The other device may be connected to the server 30.

In Modification 1D, the other device is a network camera different from the image capturing unit 11 of the wearable device 10, which is used by the site worker. The network camera transmits a captured image of a location different from that of the image capturing unit 11 of the wearable device 10 or an image of the same location, which is captured from a different angle, to the support operator terminal via the network.

(5-5) Modification 1E

In the first embodiment, the wearable device 10 and the mobile terminal 20 are each independently connected to the network via the first line (T1) or the second line (T2). In Modification 1E, the wearable device 10 and the mobile terminal 20 are connected to each other via P2P.

In Modification 1E, the wearable device 10 may be connected to the network (or the support operator terminal 40) via the first line, or the wearable device 10 and the mobile terminal 20 may communicate with each other via P2P and then the mobile terminal 20 may be connected to the network via the second line.

(5-6) Modification 1F

Another communication device is connectable to the wearable device 10 via short-range wireless communication technology. The short-range wireless communication technology may be Bluetooth (registered trademark), infrared communication, or Wi-Fi.

(5-7) Modification 1G

In the first embodiment, voice generated by the support operator is transmitted to the wearable device 10, and an image that is transmitted from the support operator terminal 40 is transmitted to the mobile terminal 20.

In Modification 1G, the site worker can use the wearable device 10, the mobile terminal 20, which is a smartphone, and a PC as a different device.

When sending an image from the support operator terminal 40, the support operator may select the mobile terminal 20 or a PC and transmit the image.

Alternatively, a configuration may be provided in which the server 30 controls the transmission of an image from the support operator terminal 40 to the worker, the support operator terminal 40 issues a command for designating a device of the worker to which the image is to be transmitted, and the server 30 accepts the command.

(5-8) Modification 1H

The worker support system according to this embodiment can be used for other purposes, for example, for training purposes.

The content of the training relates to site work such as repair or maintenance of a device. A trainee participates as a worker. The number of trainees (workers) is preferably one or two. The training is preferably performed by a minimum number of people required to perform skilled work.

The trainer of the training is a support operator. Preferably, a plurality of trainers teach each trainee from different ways of views. Thus, the trainers check different points or check an identical point from different angles. For example, a trainer who is familiar with the work itself desires to check the work done with the trainee's hands. A person who is specialized in equipment desires to generally check the state of the entire equipment, including the trainee, or to also check a measuring device such as a meter included in the equipment.

The trainer (support operator) prompts the trainee (worker) to switch to the wearable device 10 or the mobile terminal 20 such as a smartphone capable of capturing an image of a location desired to be checked or an image of the field of view, or to add such a device. Accordingly, the trainee (worker) can be supported and trained by the trainers for the work to be performed by the trainee (worker) from different viewpoints or angles.

Second Embodiment

(6) Remote Work support system according to Second Embodiment

Figure 4:
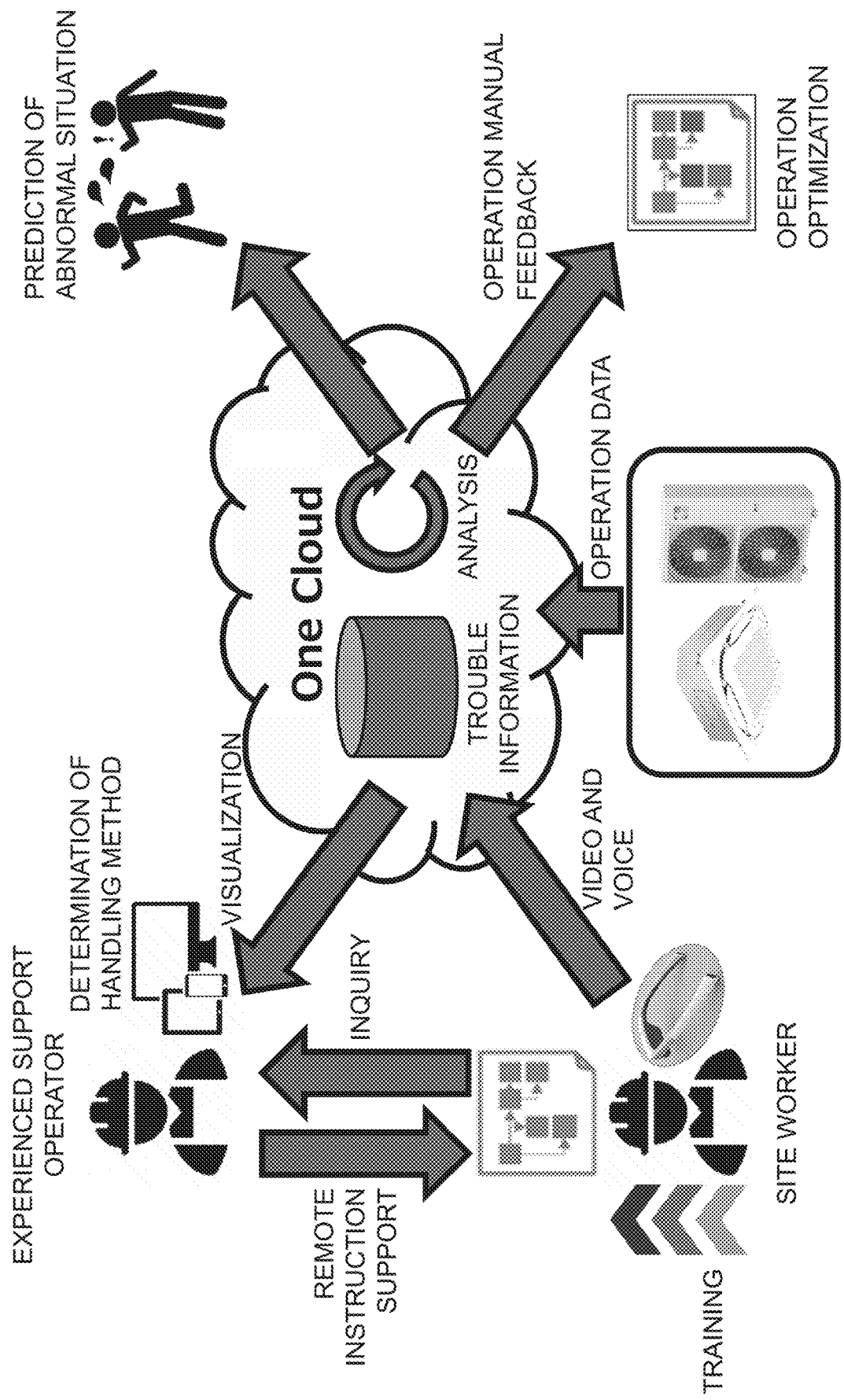
FIG. 4 is a diagram schematically illustrating a remote work support system according to a second embodiment.

FIG. 4 is a diagram schematically describing a remote work support system according to a second embodiment.

The remote work support system according to the second embodiment includes substantially the same configuration as that of the remote work support system 1 according to the first embodiment. In other words, the remote work support system according to the second embodiment includes a wearable device 10, a mobile terminal 20, a server 30, a support operator terminal 40, and a database 50. As in the first embodiment, the remote work support system performs work support, and, as a result, accumulates an image captured by the wearable device 10, text obtained by performing voice recognition of an utterance of a worker and an utterance of a support operator and converting the utterances into text, a support image created by the support operator, a work report, and so on. For work such as repair of a failure that has newly occurred, the server 30 according to the second embodiment compares data such as an image captured by the wearable device 10 with previously accumulated data and automatically determines that an abnormality or failure has occurred in a similar device. In this way, the remote work support system 1 according to this embodiment is capable of diagnosing an abnormality or failure of a device.

If the server 30 has successfully diagnosed an abnormality or failure of a device, the server 30 proposes an appropriate support method similar to the previous support method to the support operator. Alternatively, an appropriate support method similar to the previous support method is proposed directly to the worker.

In addition, the remote work support system according to this embodiment predicts a future failure of a device.

(7) Modifications

(7-1) Modification 2A

A configuration of Modification 2A is substantially the same as that of the second embodiment. In Modification 2A, the server 30 accumulates work support data, which may result in automatic identification of inappropriate points in a device operation manual or a repair and maintenance manual. In this case, the server 30 proposes correction and optimization of the operation manual or the repair and maintenance manual.

Third Embodiment

(8) Remote Work Support System According to Third Embodiment

The configuration of a remote work support system 1 according to a third embodiment is the same as the configuration of the remote work support system 1 according to the first embodiment, as illustrated in FIG. 2. The remote work support system 1 includes a plurality of devices. The plurality of devices include a wearable device 10, a mobile terminal 20, and a support operator terminal 40. The plurality of devices may further include another device. The other device may be a device that is used by a worker in addition to the wearable device 10 and the mobile terminal 20 and that supports inputting or outputting voice or an image. Specific examples of the other device may include a camera, a smartphone, a smart watch, smart glasses, a headset, and a wearable device. The other device may be a web camera similar to that in Modification 1D or a communication device similar to that in Modification 1F.

Also in this embodiment, the server 30 is connected to the plurality of devices, and information collected by the plurality of devices is collected by the server and accumulated in the storage unit 32. The information is, for example, an image captured by the wearable device 10 and voice collected by the wearable device 10 or the support operator terminal 40.

In this embodiment, the server 30 designates at least one or more devices among the plurality of devices under a predetermined condition and calls a connection target device in accordance with the designation. The server 30 may use AI technology to perform determination of the predetermined condition.

In this embodiment, the server 30 acquires environment information of the work site of the site worker and accumulates the environment information in the storage unit 32. The environment information is information such as the illumination of the work site, the level of noise in the work site, the temperature and the humidity of the work site, and whether the work is work in a high place. The server 30 may prompt the worker to use or select a device in accordance with the environment information and may call the selected device.

For example, the server 30 acquires information indicating that the worker is in a noisy environment, such as a factory, by using voice information transmitted from the wearable device 10. In this case, the server 30 prompts the worker to use a device including a directional microphone, other than the wearable device 10. In response to the worker turning on the power to the device including a directional microphone, the server 30 calls the device including a directional microphone.

In another example, the server 30 acquires information indicating that the worker is in a dark place by using image information transmitted from the wearable device 10. In this case, the server 30 prompts the worker to use a light-equipped camera (such as the mobile terminal 20 or another digital camera) other than the wearable device 10. The worker prepares a light-equipped camera, and the server 30 calls the light-equipped camera.

(9) Modifications (9-1) Modification 3A

In Modification 3A, the server 30 manages the progress of work performed by a site worker and stores the progress of the work in the storage unit 32. The server 30 calls at least one or more devices among the plurality of devices described above in accordance with the progress of the work.

For example, when the worker is performing work using smart glasses, upon determining that the next work is work in a high place from the progress of the work, the server 30 prompts the worker to remove the smart glasses because the worker with the smart glasses has a narrow field of view.

In another example, upon determining that the work requires checks from two or more viewpoints from the progress of the work, the server 30 prompts the worker to use two cameras, namely, a camera that captures the entire area and a camera that moves the area around the hands. When the worker is ready to the two cameras, the server 30 calls the two cameras.

(9-2) Modification 3B

In Modification 3B, the server 30 performs voice recognition of utterances of the site worker and the support operator. The server 30 calls at least one or more devices among the plurality of devices on the basis of a keyword acquired by the voice recognition.

For example, when a conversation between the worker and the support operator includes words "climb" or "by stepladder", the server 30 prompts the worker to use a headset. When the worker wears the headset, the server 30 calls the headset.

When the conversation between the worker and the support operator includes words "cannot hear" or "low voice", the server 30 prompts the worker to use a device equipped with a directional microphone. When the worker is ready to use the device equipped with a directional microphone, the server 30 calls the device equipped with a directional microphone.

When the conversation between the worker and the support operator includes words "not clear" or "enlarge", the server 30 prompts the worker to use a smartphone or smart glasses. When the worker is ready to use the smartphone or smart glasses, the server 30 calls the smartphone or smart glasses.

(9-3) Modification 3C

In Modification 3C, as in Modification 1H, the remote work support system 1 is used for training purposes. In this embodiment, in addition to Modification 1H, further, the server 30 accepts, from the support operator terminal 40, designation of at least one or more devices among a plurality of devices used by the site worker.

While embodiments of the present disclosure have been described, it will be understood that forms and details can be changed in various ways without departing from the spirit and scope of the present disclosure as recited in the claims.

The invention claimed is:

1. A remote work support system comprising:
    a wearable device configured to be worn by a site worker, the wearable device
        including an image capturing unit, a voice input unit, a voice output unit, and a communication unit, the wearable device not including an image display,
    the communication unit
        being configured to be connected to a network via a first communication line,
        being configured to transmit an image, and
        being configured to transmit and receive voice;
    a mobile terminal configured to be carried by the site worker separately from the wearable device, the mobile terminal including an image reception unit, connected to the network via a second communication line, the image reception unit being configured to receive an image, and a display unit configured to display a received image, the second communication line being different from the first communication line; and
    a support operator terminal configured to be used by a support operator who remotely supports the site worker, the support operator terminal
        including a voice input unit, a voice output unit, and a display unit,
        being configured to transmit and receive voice to and from the wearable device via the first communication line,
        being configured to receive an image from the wearable device, and
        being configured to transmit an image to the mobile terminal via the second communication line.

2. The remote work support system according to claim 1, wherein
    the wearable device is a neck-mounted device.

3. The remote work support system according to claim 1, wherein
    the display unit of the support operator terminal is configured to display a moving image and a still image that are captured with the image capturing unit of the wearable device.

4. The remote work support system according to claim 1, wherein
    an image captured with the image capturing unit of the wearable device
        is selected, processed, or additionally provided with information using the support operator terminal,
        is transmitted to the mobile terminal, and
        is displayed on the display unit of the mobile terminal.

5. The remote work support system according to claim 1, wherein
    an utterance of the site worker and an utterance of the support operator
        are subjected to voice recognition and
        are displayed on the display unit of the support operator terminal as text information.

6. The remote work support system according to claim 5, wherein
    the text information is further displayed on the display unit of the mobile terminal.

7. The remote work support system according to claim 1, further comprising:
    the first communication line being continuously used while the site worker works, and
    the second communication line being connected, as necessary, while the site worker works.

8. The remote work support system according to claim 1, wherein
    progress of work performed by the site worker is automatically extracted from at least one of
        an image captured with the image capturing unit and
        an utterance of the site worker and an utterance of the support operator,
    a state of progress of the work or an end time of the work is estimated, and
    the state of progress or the end time is displayed on the display unit of the support operator terminal.

9. The remote work support system according to claim 1, wherein
the support operator terminal is configured to
access a database that stores site work support information,
extract and process the site work support information, and
transmit the extracted and processed site work support information to the mobile terminal.

10. The remote work support system according to claim 1, wherein
support for the site worker through the support operator terminal includes any one or a combination of support by voice, support with a processed image, support by characters input from the support operator terminal, and support by characters obtained by converting an utterance of the support operator into text.

11. The remote work support system according to claim 1, wherein
the remote work support system includes a plurality of devices connectable to an identical server,
the plurality of devices include the wearable device, the mobile terminal, and the support operator terminal, and
the server is configured to
designate at least one of the plurality of devices in accordance with a predetermined condition, and
call a connection target device in accordance with the designation.

12. The remote work support system according to claim 11, wherein
the server is configured to acquire environment information of a work site of the site worker, and
the server is configured to call at least one of the plurality of devices based on the environment information.

13. The remote work support system according to claim 11, wherein
the server is configured to manage progress of work performed by the site worker, and
the server is configured to call at least one of the plurality of devices based on the progress of the work.

14. The remote work support system according to claim 11, wherein
the server is configured to perform voice recognition of an utterance of the site worker and an utterance of the support operator, and
the server is configured to call at least one of the plurality of devices based on a keyword acquired through the voice recognition.

15. The remote work support system according to claim 11, wherein
the server is configured to accept, from the support operator terminal, designation of at least one of the plurality of devices that are used by the site worker.

16. The remote work support system according to claim 11, wherein
the plurality of devices are capable of communicating with each other.

17. A support operator terminal configured to be used by a support operator who remotely supports a site worker, the support operator terminal comprising:
a voice input unit;
a voice output unit, and
a display unit,
the support operator terminal being configured
to transmit and receive voice to and from a wearable device via a first communication line, the wearable device being configured to be worn by the site worker, the wearable device including an image capturing unit, a voice input unit, a voice output unit, and a communication unit connected to a network via the first communication line, the wearable device not including an image display, and
to receive an image from the wearable device, and
the support operator terminal being configured to transmit an image to a mobile terminal via a second communication line, the mobile terminal being configured to be carried by the site worker separately from the wearable device, the mobile terminal including a display unit configured to display an image received by an image reception unit, the image reception unit being connected to the network via the second communication line,
the second communication line being different from the first communication line.

18. A server configured to be connected to a plurality of devices including
a wearable device configured to be worn by a site worker, the wearable device
including an image capturing unit, a voice input unit, and a voice output unit,
being configured to transmit an image, and being configured to transmit and receive voice;
a mobile terminal configured to be carried by the site worker separately from the wearable device, the mobile terminal including a display unit configured to display an image received by an image reception unit; and
a support operator terminal configured to be used by a support operator who remotely supports the site worker, the support operator terminal including a voice input unit, a voice output unit, and a display unit,
the server being configured to
acquire environment information at a work site of the site worker,
determine a predetermined condition based on the acquired environment information, the environment information being selected from a group consisting of an illumination of the work site, a level of noise of the work site, a temperature of the work site, and a humidity of the work site,
designate a type of at least one of the plurality of devices in accordance with the predetermined condition, and
call a communication target device in accordance with the designation.

* * * * *